UNITED STATES PATENT OFFICE.

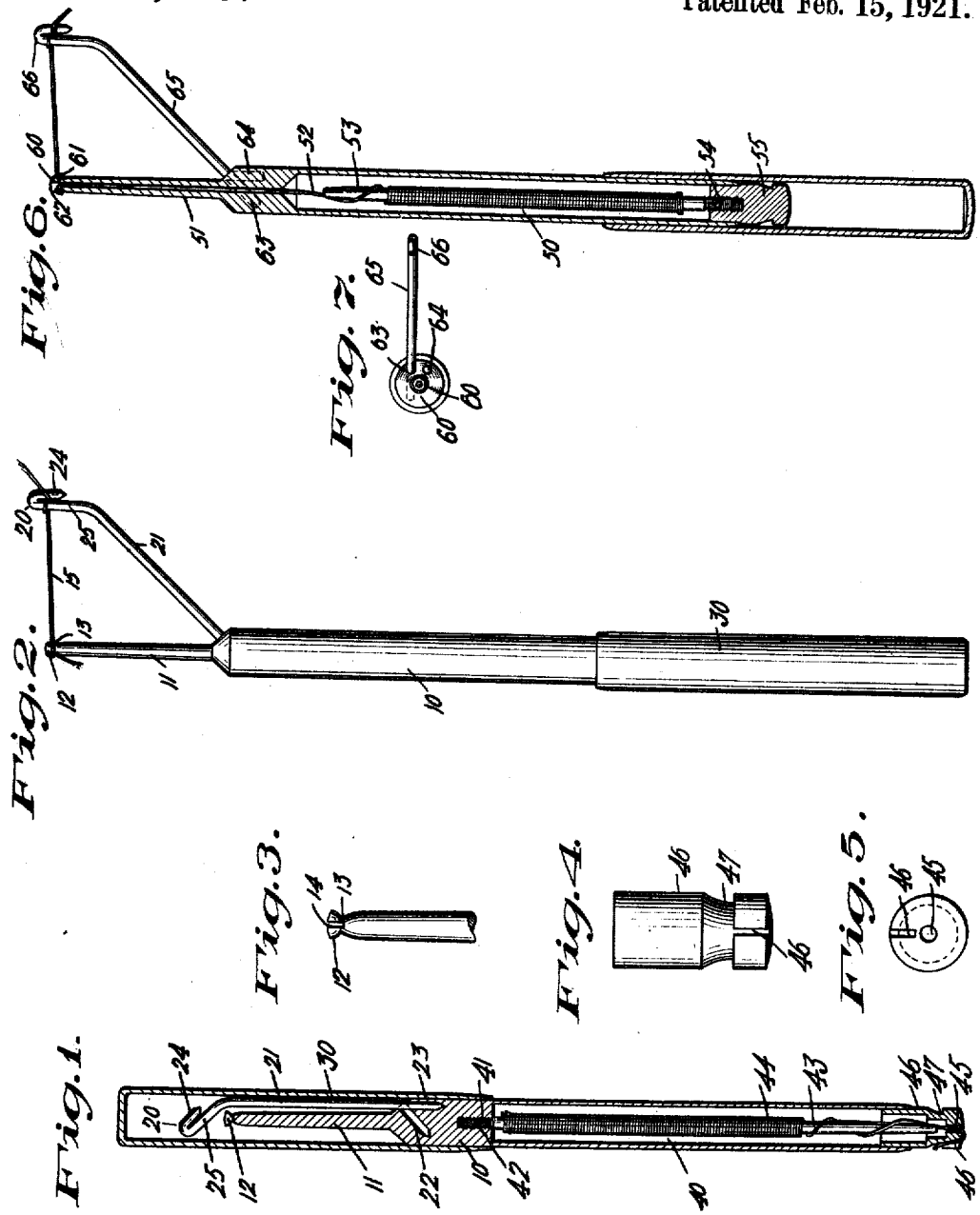

LEO JOSEPH HOGARTY, OF BROOKLYN, NEW YORK.

DENTAL-FLOSS HOLDER.

1,368,799.   Specification of Letters Patent.   Patented Feb. 15, 1921.

Application filed August 16, 1920. Serial No. 403,969.

*To all whom it may concern:*

Be it known that I, LEO J. HOGARTY, a citizen of the United States, and a resident of the city of New York, borough of Brooklyn, in the county of Kings and State of New York, have invented a new and Improved Dental-Floss Holder, of which the following is a full, clear, and exact description.

The object of the invention is to provide a new and improved dental floss holder for professional or personal use and arranged to enable the user to quickly place a piece of dental floss in stretched position on the holder and to allow of readily removing the piece of dental floss after use.

Another object is to permit the user to readily remove extraneous matter from between adjacent teeth or to apply a ligature or to perform other dental operations without requiring passing of the fingers into the mouth.

Another object is to permit of conveniently placing the parts of the holder into extended position ready for use or into folded position to allow of conveniently carrying the holder about in a vest pocket or other receptacle.

Another object is to accommodate a coil of dental floss, thus rendering the holder serviceable for a considerable length of time without requiring renewal of the dental floss.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is an enlarged sectional side elevation of the improved dental floss holder with the parts in folded position;

Fig. 2 is a side elevation of the same with the parts in extended position;

Fig. 3 is an enlarged side elevation of the upper portion of the stem on the handle;

Fig. 4 is an enlarged side elevation of the dental floss guide;

Fig. 5 is an inverted plan view of the same;

Fig. 6 is a sectional side elevation of a modified form of the dental floss holder more especially designed for professional use; and Fig. 7 is a plan view of the same.

The handle 10 of the dental floss holder illustrated in Figs. 1 to 5 is provided at one end with a stem or shank 11 terminating at its outer end in a head 12 and a neck 13 with a slot 14 extending diametrically across the head, as plainly indicated in Figs. 1 and 3. By the arrangement described one end of a piece of dental floss 15 can be readily attached to the head 12 and neck 13 by passing the dental floss through the slot 14 and wrapping it once or twice around the neck 13 (see Fig. 2). The other end of the piece of dental floss 15 is adapted to be engaged with a retaining means 20 formed on the outer end of an arm 21 adapted to engage with its other end either one of two sockets 22 or 23 formed in the handle 10 adjacent the base of the stem or shank 11. The socket 22 is at an angle to the axis of the stem 11, the axis also coinciding with that of the handle 10, and the other socket 23 is parallel to the axis of the stem 11. It will be noticed that when the arm 21 is in engagement with the socket 22 it extends at an angle to the stem 11 and hence the retaining means 20 is located opposite the head 12 and is spaced a desired distance from the same to hold the piece of dental floss 15 in stretched position between the outer ends of the stem 11 and the arm 21 (see Fig. 2). The retaining means 20 is preferably in the form of a return bent member 24 on the angular outer end 25 of the arm 21 to permit of wrapping the outer end of the piece of dental floss around the angular portion 25 with the terminal of the piece clamped between the return bent member 24 and the angular end 25. It will be noticed that when the piece of dental floss 15 is in stretched position on the stem 11 and the arm 21 it can be readily passed between adjacent teeth for removing extraneous matter or for applying a ligature or for performing other dental operations. After use the piece of dental floss 15 can be readily removed from the stem 11 and the arm 21 and thrown away. When the holder is not in use, the arm 21 is disengaged from the socket 22 and engaged with the socket 23 to extend approximately parallel to the stem 11 to permit of conveniently inclosing the stem and the arm within a cap 30 adapted to be slipped over the stem end of the handle 10, as plainly shown in Fig. 1. When the holder is in use the cap 30 is placed on the other end of the handle, as shown in Fig. 2.

The handle 10 is provided with a hollow portion 40, the bottom of which is provided with a tapped hole 41 into which screws the threaded end 42 of a spindle 43 around which is wrapped a large amount of dental floss 44. The free end of this dental floss 44 extends through a central aperture 45 formed in a guide 46 removably fitted in the upper end of the tubular portion 40. The outer end of the dental floss 44 is adapted to be passed into a slot 46 leading to a neck 47 formed exteriorly on the guide 46. By the arrangement described the outer end of the dental floss 44 is held in position to permit the user to readily take hold of this end and to draw it out of the slot 46 to pull a desired length of floss off the spindle 43 for forming the piece of dental floss 15 to be used at the time on the stem 11 and the arm 21. The sharp edge of either wall of the slot 46 at the neck 47 provides a cutting means for cutting off a piece of dental floss after the desired length is drawn out.

In the modified form shown in Figs. 6 and 7, the tubular handle 50 is provided with a tubular stem or shank 51 for the passage of dental floss 52 unwinding from a spindle 53 having a threaded end 54 screwing into a plug 55 held in the open end of the handle 50. The stem 51 has a head 60, a neck 61 and a slot 62, the same as the stem 11, for attaching the floss 53 to the stem after a desired length has been pulled out. The handle 50 is provided with angular and parallel sockets 63 and 64, similar to the sockets 22 and 23, for the reception of an arm 65 similar to the arm 21 and provided with retaining means 66 for engagement by the outer end of the pulled out piece of floss to hold that piece stretched between the stem 51 and the arm 65, as plainly shown in Fig. 6. A cap 70 is used on either end of the handle 50, the same as above described in reference to the cap 30 and the handle 10.

From the foregoing it will be seen that by the arrangement described a piece of floss can be readily placed in stretched position on the stem 11 and arm 21 or the stem 51 and the arm 65 to allow of using such piece of floss between adjacent teeth for cleaning or other purposes. It will also be noticed that the parts can be readily moved into extended or folded position and when in folded position the holder takes up very little room to allow of conveniently carrying the same in a vest pocket or other receptacle. It will also be noticed that a large amount of dental floss is provided to permit of using the holder for a considerable length of time without requiring renewal of the coil of floss on the spindle 23 or 50.

Having thus described my invention, I claim as new and desire to secure by Letters Patent:—

1. A dental floss holder, comprising a handle terminating at one end in a stem, the axis of which coincides with the axis of the handle, the stem being provided at its outer end with attaching means for attaching one end of a piece of dental floss to the stem, and an arm detachably mounted on the said handle adjacent the base of the said stem and extending at an angle to the stem, the outer end of the arm terminating in a return bend to provide an attaching means for the other end of the piece of dental floss.

2. A dental floss holder, comprising a handle provided at one end with an integral stem terminating in a head adapted to be engaged by one end of a piece of dental floss, the handle having two sockets adjacent the base of the stem, one of the sockets being approximately parallel to the stem and the other being at an angle thereto and an arm adapted to engage either socket, the arm terminating in a retaining means adapted to be engaged by the other end of the said piece of dental floss.

3. A dental floss holder, comprising a handle terminating at one end in a stem, the axis of which coincides with the axis of the handle, the stem being provided at its outer end with attaching means for attaching one end of a piece of dental floss to the stem, and an arm detachably mounted on the said handle adjacent the base of the said stem and extending at an angle to the stem, the outer end of the arm terminating in a return bend to provide an attaching means for the other end of the piece of dental floss, the said handle being provided with a hollow portion and a spindle held removably in the said hollow portion of the handle, the spindle being adapted to carry a coil of dental floss.

4. A dental floss holder, comprising a handle terminating at one end in a stem, the axis of which coincides with the axis of the handle, the stem being provided at its outer end with attaching means for attaching one end of a piece of dental floss to the stem, and an arm detachably mounted on the said handle adjacent the base of the said stem and extending at an angle to the stem, the outer end of the arm terminating in a return bend to provide an attaching means for the other end of the piece of dental floss, the said handle being provided with a hollow portion and a spindle held removably in the said hollow portion of the handle, the spindle being adapted to carry a coil of dental floss, a guide held on the open end of the hollow handle portion and provided with an aperture, a slit and a neck for the passage of the dental floss.

5. A dental floss holder, comprising a handle provided at one end with an integral stem terminating in a head adapted to be engaged by one end of a piece of dental floss, the handle having two sockets adjacent the base of the stem, one of the sockets being approximately parallel to the stem and the other being at an angle thereto, an arm adapted to engage either socket, the arm terminating in a retaining means adapted to be engaged by the other end of the said piece of dental floss, and a cap fitting onto the said handle to inclose the said stem and the said arm at the time the latter engages the parallel socket.

6. A dental floss holder, comprising a tubular handle provided at one end with a tubular stem having a retaining means, a spindle held in the said handle and carrying dental floss adapted to be drawn through the said stem to be engaged with the said retaining means, sockets in the said handle adjacent the base of the said stem, one of the sockets being parallel to the stem and the other at an angle thereto, and an arm detachably engaging either socket and provided at its free end with retaining means for the outer end of the dental floss.

LEO JOSEPH HOGARTY.